United States Patent
Li

(10) Patent No.: US 10,146,078 B2
(45) Date of Patent: Dec. 4, 2018

(54) LIQUID CRYSTAL DISPLAY PANEL AND ARRAY SUBSTRATE OF THE SAME

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Yafeng Li, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 37 days.

(21) Appl. No.: 14/889,207

(22) PCT Filed: Aug. 12, 2015

(86) PCT No.: PCT/CN2015/086781
§ 371 (c)(1),
(2) Date: Nov. 5, 2015

(87) PCT Pub. No.: WO2017/008364
PCT Pub. Date: Jan. 19, 2017

(65) Prior Publication Data
US 2017/0168347 A1    Jun. 15, 2017

(30) Foreign Application Priority Data

Jul. 14, 2015  (CN) .......................... 2015 1 0413683

(51) Int. Cl.
*G02F 1/1335*  (2006.01)
*G02F 1/1368*  (2006.01)
(Continued)

(52) U.S. Cl.
CPC ...... *G02F 1/133512* (2013.01); *G02F 1/1368* (2013.01); *G02F 1/13394* (2013.01);
(Continued)

(58) Field of Classification Search
CPC ............. G02F 1/133345; G02F 1/1368; G02F 1/134309; G02F 1/136227;
(Continued)

(56) References Cited

U.S. PATENT DOCUMENTS

2004/0026372 A1  2/2004  Takenaka et al.
2004/0095545 A1* 5/2004  Washizawa ......... G02F 1/13394
                                                                 349/155
(Continued)

FOREIGN PATENT DOCUMENTS

CN        1530706 A     9/2004
CN        1693973 A    11/2005
(Continued)

OTHER PUBLICATIONS

PCT International Search Report, PCT/CN2015/086781, 13 pages, Published Dec. 28, 2015.*

*Primary Examiner* — Michael Caley
*Assistant Examiner* — Mariam Qureshi
(74) *Attorney, Agent, or Firm* — Andrew C. Cheng

(57) ABSTRACT

An array substrate for a liquid crystal display panel is disclosed. The array substrate includes a first substrate, a Lower Temperature Polycrystal Silicon (LTPS) Thin-Film-Transistor (TFT) disposed on the first substrate, a color photoresist layer disposed on the LTPS TFT, and multiple photo spacers disposed above the color photoresist layer. A liquid crystal display panel including the array substrate and a second substrate disposed oppositely to the array substrate is also disclosed. The present invention utilizes the second substrate to be aligned with the LTPS TFT array substrate in (Continued)

order to form the liquid crystal display panel. Because the second substrate is a bare substrate (without a pattern), when the second substrate is aligned with the array substrate, the alignment precision is not under consideration. Accordingly, apertures ratios of the liquid crystal display panel do not have difference.

10 Claims, 2 Drawing Sheets

(51) Int. Cl.
    *G02F 1/1333*     (2006.01)
    *G02F 1/1339*     (2006.01)
    *G02F 1/1362*     (2006.01)
    *G02F 1/1343*     (2006.01)

(52) U.S. Cl.
    CPC .. *G02F 1/133345* (2013.01); *G02F 1/134309* (2013.01); *G02F 1/136227* (2013.01); *G02F 2001/13396* (2013.01); *G02F 2001/13398* (2013.01); *G02F 2001/136222* (2013.01); *G02F 2201/121* (2013.01); *G02F 2201/123* (2013.01); *G02F 2201/40* (2013.01); *G02F 2202/104* (2013.01)

(58) Field of Classification Search
    CPC ..... G02F 2202/104; G02F 2001/13398; G02F 2201/121; G02F 2001/136222; G02F 2201/40; G02F 1/134363; G02F 2001/134372

See application file for complete search history.

(56) References Cited

U.S. PATENT DOCUMENTS

| | | | | |
|---|---|---|---|---|
| 2005/0140858 A1* | 6/2005 | Park | ................... | G02F 1/13394 349/110 |
| 2011/0051054 A1* | 3/2011 | Wang | ................ | G02F 1/136277 349/106 |
| 2014/0055726 A1* | 2/2014 | Cho | .................. | G02F 1/134309 349/106 |
| 2016/0062203 A1* | 3/2016 | Ono | .................. | G02F 1/134363 349/43 |
| 2016/0187693 A1* | 6/2016 | Woo | .................... | G02F 1/13338 257/72 |

FOREIGN PATENT DOCUMENTS

| | | |
|---|---|---|
| CN | 100526958 C | 8/2009 |
| CN | 101726907 A | 6/2010 |
| CN | 102062968 A | 5/2011 |
| CN | 103383946 A | 11/2013 |
| CN | 103913883 A | 7/2014 |

* cited by examiner

LIQUID CRYSTAL DISPLAY PANEL AND ARRAY SUBSTRATE OF THE SAME

BACKGROUND OF THE INVENTION

1. Field of the Invention

The present invention belongs to a liquid crystal display technology field, and more particular to a Lower-Temperature-Polycrystal-Silicon (LTPS) Thin-Film-Transistor (TFT) array substrate and a liquid crystal display panel having the same.

2. Description of Related Art

With the development of optical and semiconductor technology, the Flat Panel Display (FPD) also develops vigorously. In many types of the Flat Panel Display, the Liquid Crystal Display (LCD) has become the mainstream of the market because of superior characteristics of high space utilization efficiency, low power consumption and low electromagnetic interference.

Currently, an amorphous silicon thin film transistor (a-Si TFT) is widely used as a switching element of the LCD. However, a a-Si TFT LCD is limited for satisfying the requirements of thin, lightweight, high-definition, high brightness, high reliability, low power consumption. Comparing with the a-Si TFT LCD, a Lower-Temperature-Polycrystal-Silicon (LTPS) TFT LCD has an obvious advantage for satisfying the above requirements.

In a current LTPS-TFT LCD, a liquid crystal display panel formed by a color-filter substrate (referred to as CF substrate) and an array substrate aligned with each other is usually provided. In the liquid crystal display panel, in order to prevent an edge of a pixel from light leakage, a black matrix (referred to as BM) on the CF substrate is usually utilized to shield an edge of a pixel. At the same time, when a light enters from a side of the CF substrate, the black matrix can also prevent a decreasing contrast ratio problem because of a reflective light of a source/drain metal layer on the array substrate. Accordingly, when the CF substrate and the array substrate are aligned, an alignment precision of the black matrix and the source/drain metal layer should be considered. Under the current process capability, an alignment deviation of the black matrix and the source/drain metal layer will be generated. Sometimes, the alignment deviation reaches ±5 μm such that apertures ratio for pixels of the liquid crystal display panel manufactured by the current process capability exist great difference in order to affect a quality of a liquid crystal display panel.

SUMMARY OF THE INVENTION

In order to solve the above technology problems, the purpose of the present invention is to provide an array substrate for a liquid crystal display panel, comprising: a first substrate; a Lower-Temperature-Polycrystal-Silicon (LTPS) Thin-Film-Transistor (TFT) disposed on the first substrate; a color photoresist layer disposed on the LTPS TFT; and multiple photo spacers disposed above the color photoresist layer.

Wherein, the array substrate further includes: a light-shielding layer disposed between the first substrate and the LTPS TFT, wherein, the light-shielding layer and the LTPS TFT are disposed oppositely.

Wherein, the array substrate further includes: a first insulation layer disposed between the light-shielding layer and the LTPS TFT, wherein, the first insulation layer covers the light-shielding layer.

Wherein, the LTPS TFT includes: a polysilicon layer disposed on the first insulation layer; a second insulation layer disposed on the first insulation layer and covering the polysilicon layer; a gate metal layer disposed on the second insulation layer; a third insulation layer disposed on the second insulation layer covering on the gate metal layer; a first through hole and a second through hole located in the third insulation layer and the second insulation layer, wherein, the first through hole and the second through hole reveal a surface of the polysilicon layer; a source metal layer and a drain metal layer disposed on the third insulation layer, wherein, the source metal layer fills the first through hole and contacts with the surface of the polysilicon layer, and the drain metal layer fills the second through hole and contacts with the surface of the polysilicon layer; a first planar layer disposed on the third insulation layer and covering the source metal layer and the drain metal layer; a common electrode layer disposed on the first planar layer; a first passivation layer disposed on the common electrode layer; a via hole located in the first passivation layer, the common electrode layer and the first planar layer, wherein, the via hole reveals a surface of the drain metal layer; a pixel electrode layer disposed on the first passivation layer, wherein, the pixel electrode layer is contacted with the surface of the drain metal layer by the via hole; and a second passivation layer covering the pixel electrode layer.

Wherein, the color photoresist layer includes: a red photoresist layer, a green photoresist layer and a blue photoresist layer, wherein, the red photoresist layer, the green photoresist layer and the blue photoresist layer are formed on the second passivation layer.

Wherein, the array substrate further includes: a second planar layer disposed on the second passivation layer, wherein, the second planar layer fills the via hole.

Wherein, the multiple photo spacers includes: a main photo spacer and a sub photo spacer, wherein, the main photo spacer and the sub photo spacer are both located on the second planar layer.

Another purpose of the present invention is to provide a liquid crystal display panel comprising a second substrate disposed oppositely to the above array substrate.

Wherein, the liquid crystal display panel further includes: a black light-shielding layer disposed at a surface of the second substrate far away from the array substrate, wherein, the black light-shielding layer is disposed oppositely to the LTPS TFT, and a light-shielding area of the black light-shielding layer is greater than a light-shielding area of the light-shielding layer of the array substrate.

Wherein, the liquid crystal display panel further includes: a third passivation layer disposed at a surface of the second substrate far away from the array substrate and covering the black light-shielding layer.

The beneficial effects of the present invention: because the second substrate is a bare substrate (without any pattern), when the second substrate is aligned with the array substrate, the alignment precision is not under consideration. Accordingly, apertures ratios of the liquid crystal display panel do not have difference.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

It should be noted that, herein, relational terms such as first and second, and the like are only used to distinguish one entity or operation from another entity or operation. It is not required or implied that these entities or operations exist any such relationship or order between them. Moreover, the terms "comprise," include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one . . . " element defined does not exclude the existence of additional identical elements in the process, method, article, or apparatus.

It can also be understood that when a layer or an element is called or formed on another layer or a substrate, the layer or the element can be directly formed on the another layer or the substrate, or an intermediate layer may exist.

Figure 1:
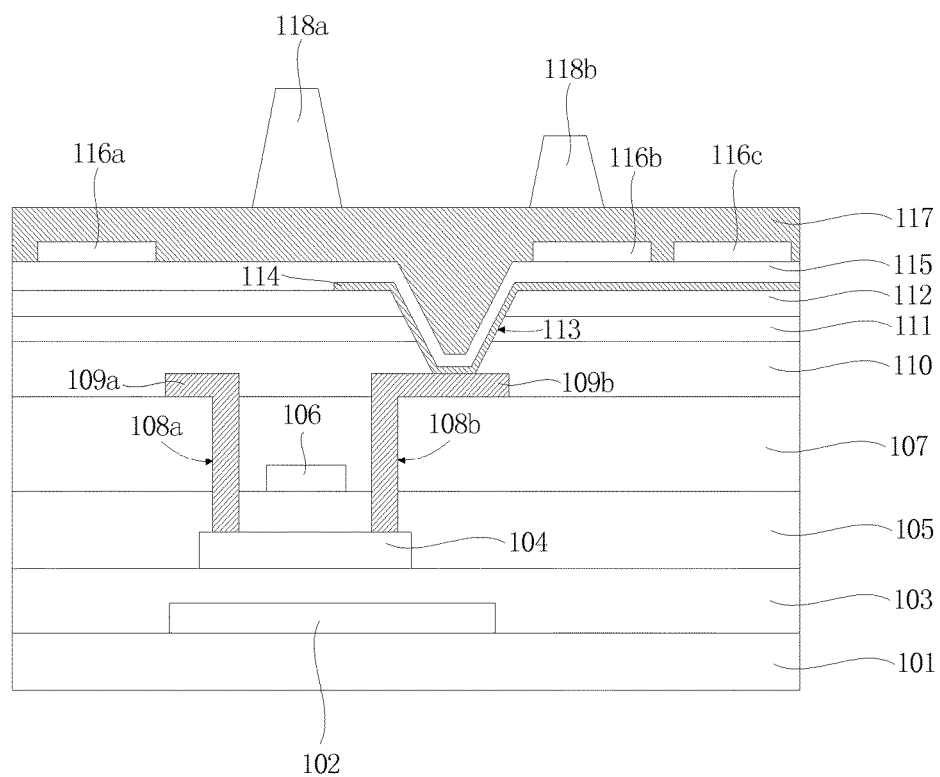
FIG. 1 is a schematic diagram of a LTPS-TFT array substrate according to an embodiment of the present invention.

FIG. 1 is a schematic diagram of a LTPS-TFT array substrate according to an embodiment of the present invention With reference to FIG. 1, a LTPS-TFT array substrate according to an embodiment of the present invention includes: a first substrate 101, a Lower Temperature-Polycrystal-Silicon (LTPS) Thin-Film-Transistor (TFT), a color photoresist layer formed on the LTPS TFT, and multiple photo spacers formed above the color photoresist layer 116a, 116b, and 116c. In the present embodiment, the first substrate 101 can be a transparent glass substrate, but the present invention is not limited. For example, the first substrate 101 can also be a transparent resin substrate.

Furthermore, in order to prevent the LTPS TFT from generating a leakage current because of irradiating by a light, the array substrate also includes: a light-shielding layer 102 formed between the first substrate 101 and the LTPS TFT. Wherein, the light-shielding layer 102 and the LTPS TFT are disposed oppositely so that the light-shielding layer 102 shields a light for a channel of the LTPS TFT. Furthermore, the light-shielding layer 102 is disposed right oppositely to the LTPS TFT. That is, viewing from bottom to top, the light-shielding layer 102 can completely shield the LTPS TFT.

Besides, the array substrate further includes: a first insulation layer 103 formed between the first substrate 101 and the LTPS TFT. Wherein, the first insulation layer 103 covers the light-shielding layer 102. That is, the light-shielding layer 102 is directly formed on the first substrate 101. The first insulation layer 103 is directly formed on the first substrate 101 and covers the light-shielding layer 102. The LTPS TFT is directly formed on the first insulation layer 103. In the present embodiment, the first insulation layer 103 is formed by silicon nitride and silicon oxide. However, the present invention is not limited.

The following content will describe the LTPS TFT according to an embodiment of the present invention in detail. The LTPS TFT according to an embodiment of the present invention includes:

A polysilicon layer 104 is provided on the first insulation layer 103, the polysilicon layer 104 is used for forming a carrier moving channel;

A second insulation layer 105 is disposed on the first insulation layer 103 and covers the polysilicon layer 104. Wherein, in the present embodiment, the second insulation layer 105 is formed by silicon nitride and silicon oxide. However, the present invention is not limited.

A gate metal layer 106 is disposed on the second insulation layer 105.

A third insulation layer 107 is disposed on the second insulation layer 105 and covers the gate metal layer 106. Wherein, in the present embodiment, the third insulation layer 107 is formed by silicon nitride and silicon oxide. However, the present invention is not limited.

A first through hole 108a and a second through hole 108b are located in the third insulation layer 107 and the second insulation layer 105. Wherein, the first through hole 108a and the second through hole 108b reveal a surface of the polysilicon layer 104.

A source metal layer 109a and a drain metal layer 109b are disposed on the third insulation layer 107. Wherein, the source metal layer 109a fills the first through hole 108a and contacts with the surface of the polysilicon layer 104. The drain metal layer 109b fills the second through hole 108b and contacts with the surface of the polysilicon layer 104.

A first planar layer 110 disposed on the third insulation layer 107 and covers the source metal layer 109a and the drain metal layer 109b. In the present embodiment, the first planar layer 110 is an organic planar layer. However, the present invention is not limited.

A common electrode layer 111 disposed on the first planar layer 110. In the present embodiment, the common electrode layer 111 is made of Indium-Tin-Oxide (ITO). However, the present invention is not limited.

A first passivation layer 112 disposed on the common electrode layer 111.

A via hole 113 located in the first passivation layer 112, the common electrode layer 111 and the first planar layer 110. Wherein, the via hole 113 reveals a surface of the drain metal layer 109b.

A pixel electrode layer 114 is disposed on the first passivation layer 112. Wherein, the pixel electrode layer 114 is contacted with the surface of the drain metal layer 109b by the via hole 113. In the present embodiment, the pixel electrode layer 114 is made of Indium-Tin-Oxide (ITO). However, the present invention is not limited.

A second passivation layer 115 covers the pixel electrode layer 114.

In addition, in the present embodiment, the color photoresist layer includes: a red photoresist layer 116a, a green photoresist layer 116b and a blue photoresist layer 116c. Wherein, the red photoresist layer 116a, the green photoresist layer 116b and the blue photoresist layer 116c are directly formed on the second passivation layer 115.

Besides, the array substrate also includes: a second planar layer 117 is disposed on the second passivation layer 115 and covers the red photoresist layer 116a, the green photoresist layer 116b and the blue photoresist layer 116c. Wherein, the second planar layer 117 fills the via hole 113. In the present embodiment, the second planar layer 117 is an organic planar layer. However, the present invention is not limited.

Furthermore, the photo spacers include: a main photo spacer 118a and a sub photo spacer 118b. Wherein, the main photo spacer 118a and the sub photo spacer 118b are both located on the second planar layer 117.

Figure 2:
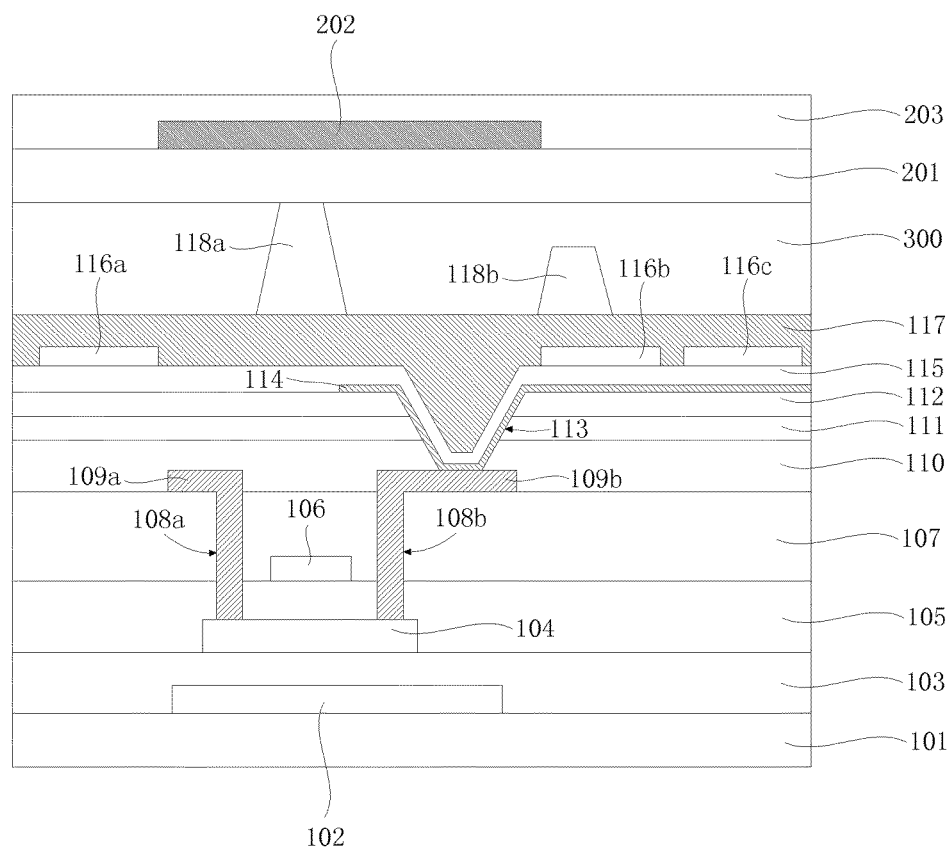
FIG. 2 is a schematic diagram of a liquid crystal display panel according to an embodiment of the present invention.

FIG. 2 is a schematic diagram of a liquid crystal display panel according to an embodiment of the present invention.

With reference to FIG. 2, the liquid crystal display panel according to an embodiment of the present invention includes: a second substrate 201 disposed oppositely to the LTPS TFT array substrate, and a liquid crystal layer 300 disposed between the array substrate and the second substrate 201.

In the present embodiment, the second substrate 201 can be a transparent glass substrate, but the present invention is not limited. For example, the second substrate 201 can also be a transparent resin substrate.

In order to prevent an incident light from the second substrate 201 from being reflected by the metal layers (such as the source metal layer 109a and the drain metal layer 109b) of the LTPS TFT array substrate so as to decrease the contrast ratio of the liquid crystal display panel, in the present embodiment, a surface of the second substrate 201 far away from the LTPS TFT array substrate (that is, a top surface of the second substrate 201) is provided with a black light-shielding layer 202. The black light-shielding layer 202 is disposed oppositely to the LTPS TFT. Furthermore, the black light-shielding layer 202 is disposed right opposite to the LTPS TFT.

In addition, a light-shielding area of the black light-shielding layer 202 is greater than a light-shielding area of the light-shielding layer 102. That is, when viewing from top to bottom, the black light-shielding layer 202 can completely block the LTPS TFT and the light-shielding layer 102. In the present embodiment, the black light-shielding layer 202 is made of chromium. However, the present invention is not limited. For example, the black light-shielding layer 202 can be made by other black metals, or a black resin.

In addition, in order to protect the black light-shielding layer 202, a third passivation layer 203 is disposed at a surface of the second substrate 201 far away from the LTPS TFT array substrate (that is, a top surface of the second substrate 201). Wherein, the third passivation layer 203 covers the black light-shielding layer 202.

In summary, according to the embodiments of the present invention, because the second substrate is a bare substrate (without a pattern), when the second substrate is aligned with the array substrate, the alignment precision is not under consideration. Accordingly, apertures ratios of the liquid crystal display panel do not have difference.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. An array substrate for a liquid crystal display panel, comprising:
   a first substrate;
   a first insulation layer disposed on the first substrate;
   a Lower-Temperature-Polycrystal-Silicon (LTPS) Thin-Film-Transistor (TFT) disposed on the first insulation layer;
   a color photoresist layer disposed on the LTPS TFT; and
   multiple photo spacers disposed above the color photoresist layer;
   wherein, the LTPS TFT includes:
   a polysilicon layer disposed on the first insulation layer;
   a second insulation layer disposed on the first insulation layer and covering the polysilicon layer;
   a gate metal layer disposed on the second insulation layer;
   a third insulation layer disposed on the second insulation layer covering on the gate metal layer;
   a first through hole and a second through hole located in the third insulation layer and the second insulation layer, wherein, the first through hole and the second through hole reveal a surface of the polysilicon layer;
   a source metal layer and a drain metal layer disposed on the third insulation layer, wherein, the source metal layer fills the first through hole and contacts with the surface of the polysilicon layer, and the drain metal layer fills the second through hole and contacts with the surface of the polysilicon layer;
   a first planar layer disposed on the third insulation layer and covering the source metal layer and the drain metal layer;
   a common electrode layer directly disposed on the first planar layer;
   a first passivation layer disposed on the common electrode layer;
   a via hole located in the first passivation layer, the common electrode layer and the first planar layer, wherein, the via hole reveals a surface of the drain metal layer;
   a pixel electrode layer disposed on the first passivation layer and disposed in the via hole, wherein, the pixel electrode layer is contacted with the surface of the drain metal layer by the via hole;
   a second passivation layer directly covering on the pixel electrode layer and the first passivation layer; and
   a second planar layer disposed on the second passivation layer, wherein the second planar layer fills the via hole, and the second planar layer provides with a flat upper surface;
   wherein the color photoresist layer is disposed directly on the second passivation layer, and disposed between the second passivation layer and the second planar layer;
   wherein the multiple photo spacers are directly disposed on the flat upper surface of the second planar layer; and
   wherein the multiple photo spacers includes multiple main photo spacers and multiple sub photo spacers, and a height of each main photo spacer is greater than a height of each sub photo spacer.

2. The array substrate according to claim 1, wherein, the array substrate further includes: a light-shielding layer disposed between the first substrate and the LTPS TFT, wherein, the light-shielding layer and the LTPS TFT are disposed oppositely, and the light-shielding layer completely shields the LTPS TFT.

3. The array substrate according to claim 2, wherein, the color photoresist layer includes: a red photoresist layer, a green photoresist layer and a blue photoresist layer.

4. The array substrate according to claim 3, wherein, each of the main photo spacers is disposed corresponding to the LTPS TFT.

5. A liquid crystal display panel, comprising:
   an array substrate; and a second substrate disposed oppositely to the array substrate;
a liquid crystal layer;
wherein, the array substrate includes:
  a first substrate;
  a first insulation layer disposed on the first substrate;
  a Lower-Temperature-Polycrystal-Silicon (LTPS) Thin-Film-Transistor (TFT) disposed on the first substrate;
  a color photoresist layer disposed on the LTPS TFT; and
  multiple photo spacers disposed above the color photoresist layer;
  wherein, the LTPS TFT includes:
    a polysilicon layer disposed on the first insulation layer;
    a second insulation layer disposed on the first insulation layer and covering the polysilicon layer;
    a gate metal layer disposed on the second insulation layer;
    a third insulation layer disposed on the second insulation layer covering on the gate metal layer;
    a first through hole and a second through hole located in the third insulation layer and the second insulation layer, wherein, the first through hole and the second through hole reveal a surface of the polysilicon layer;
    a source metal layer and a drain metal layer disposed on the third insulation layer, wherein, the source metal layer fills the first through hole and contacts with the surface of the polysilicon layer, and the drain metal layer fills the second through hole and contacts with the surface of the polysilicon layer;
    a first planar layer directly disposed on the third insulation layer and covering the source metal layer and the drain metal layer;
    a common electrode layer disposed on the first planar layer;
    a first passivation layer disposed on the common electrode layer;
    a via hole located in the first passivation layer, the common electrode layer and the first planar layer, wherein, the via hole reveals a surface of the drain metal layer;
    a pixel electrode layer disposed on the first passivation layer and disposed in the via hole, wherein, the pixel electrode layer is contacted with the surface of the drain metal layer by the via hole;
    a second passivation layer directly covering on the pixel electrode layer and the first passivation layer; and
    a second planar layer disposed on the second passivation layer, wherein the second planar layer fills the via hole, and the second planar layer provides with a flat upper surface;
  wherein the color photoresist layer is disposed directly on the second passivation layer, and disposed between the second passivation layer and the second planar layer;
  wherein the multiple photo spacers are directly disposed on the flat upper surface of the second planar layer;
  wherein the multiple photo spacers includes multiple main photo spacers and multiple sub photo spacers, and a height of each main photo spacer is greater than a height of each sub photo spacer; and
  wherein the liquid crystal layer is disposed between the flat upper surface of the second planar layer and the second substrate.

6. The liquid crystal display panel according to claim 5, wherein, the array substrate further includes: a light-shielding layer disposed between the first substrate and the LTPS TFT, wherein, the light-shielding layer and the LTPS TFT are disposed oppositely, and the light-shielding layer completely shields the LTPS TFT.

7. The liquid crystal display panel according to claim 6, wherein, the color photoresist layer includes: a red photoresist layer, a green photoresist layer and a blue photoresist layer.

8. The liquid crystal display panel according to claim 7, wherein, each of the main photo spacers is disposed corresponding to the LTPS TFT.

9. The liquid crystal display panel according to claim 6, wherein, the liquid crystal display panel further includes: a third passivation layer disposed at a surface of the second substrate away from the array substrate and covering the black light-shielding layer.

10. The liquid crystal display panel according to claim 5, wherein, the liquid crystal display panel further includes: a black light-shielding layer disposed at a surface of the second substrate away from the array substrate, wherein, the black light-shielding layer is disposed right opposite to the LTPS TFT, and a light-shielding area of the black light-shielding layer is greater than a light-shielding area of the light-shielding layer of the array substrate such that the black light-shielding layer completely blocks the LTPS TFT and the light-shielding layer, and the black light-shielding layer is disposed above the main photo spacer.

* * * * *